United States Patent [19]
Yasuda

[11] Patent Number: 6,130,710
[45] Date of Patent: *Oct. 10, 2000

[54] IMAGE PICKUP CONTROL METHOD AND IMAGE PICKUP DEVICE

[75] Inventor: Hitoshi Yasuda, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/446,257

[22] Filed: May 22, 1995

[30] Foreign Application Priority Data

May 20, 1994 [JP] Japan ................................. 6-106642

[51] Int. Cl.$^7$ ................................................. H04N 5/225
[52] U.S. Cl. .......................... 348/220; 348/222; 348/312
[58] Field of Search ...................................... 348/207, 220, 348/221, 222, 223, 224, 229, 230, 231, 239, 362, 363, 364, 365, 366, 367, 368; 386/38, 117, 121

[56] References Cited

U.S. PATENT DOCUMENTS

| | | | |
|---|---|---|---|
| 4,837,628 | 6/1989 | Sasaki | 358/209 |
| 5,019,911 | 5/1991 | Okino et al. | 358/213 |
| 5,027,214 | 6/1991 | Fujimori | 358/209 |
| 5,264,939 | 11/1993 | Chang | 358/213.22 |
| 5,517,242 | 5/1996 | Yamada et al. | 348/254 |

*Primary Examiner*—Wendy Garber
*Assistant Examiner*—Christopher Onuaku
*Attorney, Agent, or Firm*—Morgan & Finnegan LLP

[57] ABSTRACT

The present invention provides an image pickup device which is capable of easily obtain image pickup control constants in accordance with switching of image pickup modes. The image pickup device, being equipped with an image pickup sensor having the number of pixels allowing a high resolution, employs a synchronizing signal generator and first color processing section in a first image pickup mode for lower resolution. Further, an image pickup control constant is calculated in an image pickup control constant calculating section and held or corrected and held in an image pickup control constant holding/correcting section. In switching to a second image pickup mode, the image pickup device uses a synchronizing signal generator and second color processing section, and employs the held image pickup control constant as an image pickup control constant for the second image pickup mode. This device does not require re-calculation of the image pickup control constant when switching is made from the first image pickup mode to the second image pickup mode, thus allowing immediately taking an image in the second image pickup mode.

22 Claims, 7 Drawing Sheets

IMAGE PICKUP CONTROL METHOD AND IMAGE PICKUP DEVICE

BACKGROUND OF THE INVENTION

The present invention relates to an image pickup control method and image pickup device using an image pickup element, such as a CCD, and operable in a plurality of image pickup modes with different resolutions.

FIG. 7 is a block diagram showing an arrangement of a conventional image pickup device having a plurality of image pickup modes.

Here, a description will be made in terms of an arrangement and operation of an image pickup control system. An image signal, outputted from an A/D converting section 5, is inputted into an image pickup control section 22. In the image pickup control section 22, an image pickup control constant calculating section 22a calculates image pickup control constants, for example, such an evaluation value for automatic focusing control as a peak value of a luminance signal within a given frame region of an image signal and a difference value between the maximum and minimum luminance values of a line, such an evaluation value for automatic aperture control as a differential value of a luminance signal within a given frame region, and such an evaluation value for automatic white balance control as an integral value of a luminance signal within a given frame region and an integral value of a color-difference signal. These image pickup constant values depends on arrangements of an image pickup optical system and processing system, and this specification does not limit them to a particular value.

On the basis of these constant values, control is made in terms of, for example, a focusing lens (included in an optical lens 1) for providing an optimal focus, an aperture 2, shutter speed (an optical charging time of an image pickup sensor 3) and a gain (a gain of an SH/AGC section 4) for offering an optimal exposure, and a color correction (a correction for first and second color processing sections 7, 12) for regulating the white balance.

In addition, in accordance with an instruction from a system control section 23 depending on an input from an operation section 24, there are carried out the image pickup mode switching control, i.e., the operation of a change-over switch 6 for a signal processing system, the operation of a change-over switch 20 for a synchronizing signal generator, the manual setting of various image pickup control constants, and so on.

Furthermore, a description will be made in terms of the operation of the image pickup control section 22 with reference to an operational algorithm of FIG. 6. A decision is first made as to whether a first or second mode is taken as the image pickup mode (step S001, which will be referred hereinafter to as S001). When taking the first image pickup mode, the image pickup control constant calculating section 22a calculates an image pickup control constant for the first image pickup mode (S002), and sets the image pickup mode change-over switches 6, 20 to the first image pickup mode side (S003). Then, the control output for an image pickup system is made on the basis of the image pickup control constants (S004).

On the other hand, in the second image pickup mode, a still picture is first temporarily image-picked up (S005), and the image pickup control constants for the second image pickup mode are then calculated in the image pickup control constant calculating section 22a (S006). The same process is done in terms of n still pictures (S007). This n is indicative of the number of pictures necessary for the determination of the image pickup control constants in the second image pickup mode and takes an integer of 1 or more. After the completion of the calculation, the image pickup mode change-over switches 6, 20 are set to the second image pickup mode side (S008) before the control output for the image pickup system is made on the basis of the image pickup control constants (S009). This state is maintained until the switching instruction to the first image pickup mode is given (S010).

However, there are the following problems which arise with such a conventional apparatus. That is, the first disadvantage is that, when the change-over is made from the first image pickup mode (for example, a video rate) to the second image pickup mode (for example, a high-resolution still picture rate), the image pickup control constants for the second image pickup mode are required to be newly calculated from the beginning, whereby pictures (n pictures) need to be in advance taken several times. A long time is required for taking or receiving the high-resolution images in the second image pickup mode, and therefore the normal images cannot be taken immediately after the change-over to the second image pickup mode.

The second disadvantage is that, when a still picture is taken during the operation in the first image pickup mode, the user is needed to carry out the change-over of the image pickup mode, the decision as to whether or not to complete to take the still picture, and the change-over to the original image pickup mode. Thus, the user has to pay attention to these operations until completing to take the still picture.

SUMMARY OF THE INVENTION

The present invention is for eliminating the above-mentioned problems, and it is therefore an object of this invention to provide an image pickup device which is capable of immediately taking a picture in the second image pickup mode in changing over from the first image pickup mode (for example, a video rate) to the second image pickup mode (for example, a high-resolution still picture rate).

Another object of this invention is to provide an image pickup device which is capable of, with one still-picture inputting operation, automatically performing a series of control operations for an image pickup means, such as entering into the second image pickup mode, starting to taking a still picture, sensing the completion of the input of the still picture, returning to the original image pickup mode after the completion of the input of the still picture.

In an image pickup device operable in a plurality of image pickup modes, there is incorporated an image pickup control constant holding/correcting section whereby, when a switching is made from the first image pickup mode (for example, video rate) to the second image pickup mode (for example, high-resolution still picture rate), there is no need for re-calculation of the image pickup control constant in the second image pickup mode and reception of an image for the re-calculation, thus permitting immediate reception of an image in the second image pickup mode and making the device very easy to use.

Furthermore, in an image pickup device operable in a plurality of image pickup modes, there are incorporated an image pickup control constant holding/correcting section and a still picture receiving control section which allows, with one still picture receiving input operation, automatically performing a series of image pickup mode switching control in the still picture receiving operation, such as switching the image pickup mode, starting the still picture reception, monitoring image pickup time, completing the image pickup, and returning to the original state after the completion, and further which permits the switching between the image pickup control constants accordingly. This can eliminate the need for the user paying attention to the operation thereof till the completion of the still picture reception, thereby making the device very easy to use.

The above and other objects, features, and advantages of the Invention will become more apparent from the following description when taken in conjunction with the accompanying drawings.

DESCRIPTION OF THE PREFERRED EMBODIMENTS

A description of a first embodiment according to the present invention will be made hereinbelow with reference to FIG. 1 which is a block diagram showing an arrangement of an image pickup device with a plurality of image pickup modes, where numeral 1 represents an optical lens, 2 designates an aperture, 3 denotes an image pickup sensor for converting an optical signal into an electrical signal, 4 depicts a SH/AGC section for carrying out the sample-and-hold of an image signal taken with the image pickup sensor and for performing the automatic gain control (AGC) therefor, 5 stands for an analog-to-digital (A/D) converting section, and 6 indicates a switch for changing over the output of the A/D converting section 5.

Figure 1:
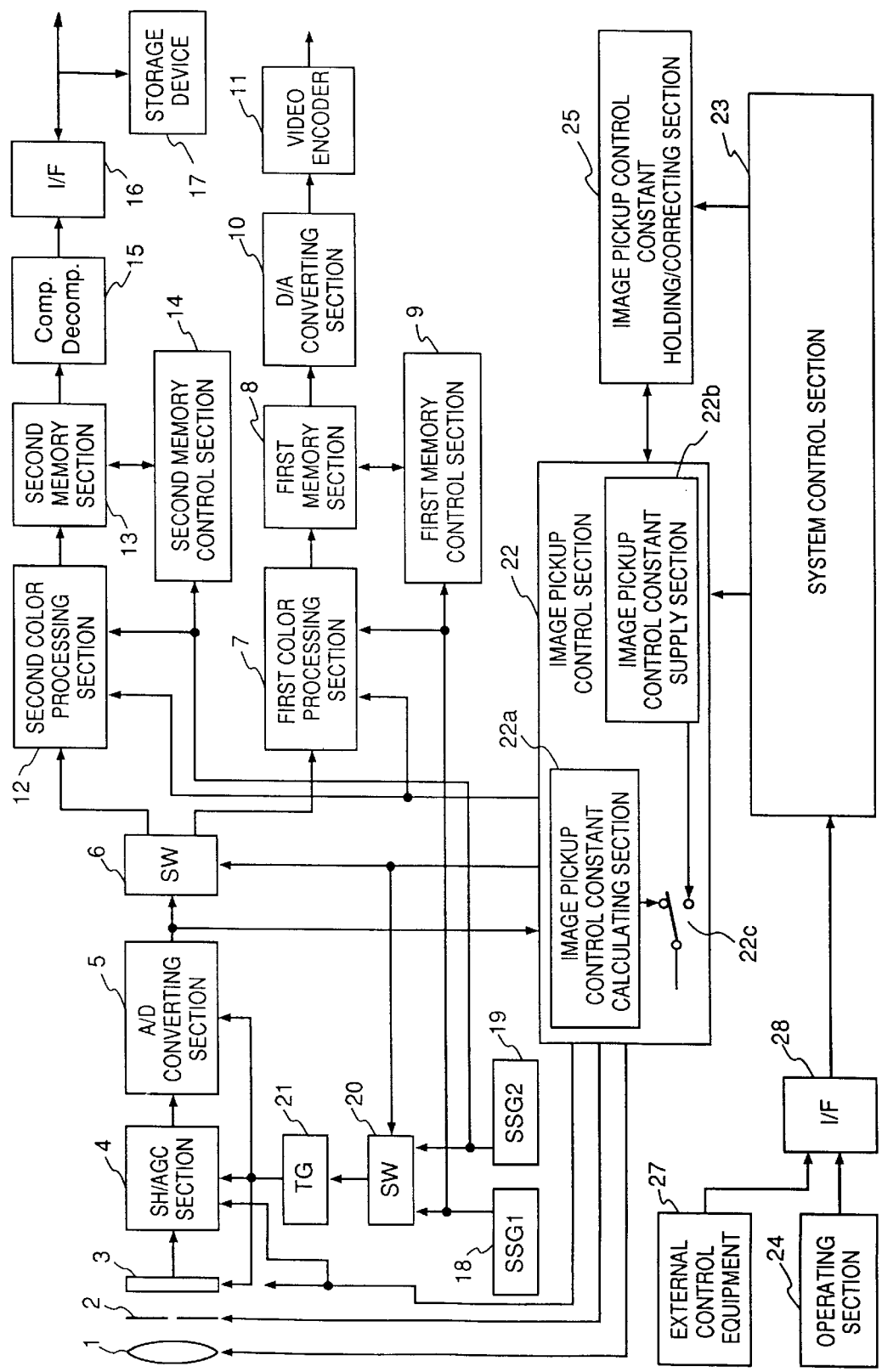
FIG. 1 is a block diagram showing an arrangement of an image pickup device according to a first embodiment of this invention.

Furthermore, in FIG. 1, the image pickup device also includes a first color processing section 7 for low resolution, a first memory 8 for storing image signals (for example, YUV, RGB) outputted from the first color processing section 7, a first memory controller 9 for controlling the first memory 8, a digital-to-analog (D/A) converting section 10, and a video encoder 11 for converting into a video signal (for example, NTSC, PAL) the image signal from the D/A converting section 10.

In addition, there are also included a second color processing section 12 for high resolution, a second memory 13 for making the storage of the image signal (such as YUV, RGB) outputted from the second color processing section 12, a second memory controller 14 for controlling the second memory 13, a compression/decompression device (Comp. Decomp) 15 for compressing and decompressing, the image signal (YUV, RGB) outputted from the second memory 13 or the image signal (YUV, RGB) outputted from the second color processing section 12, an interface (i/f) 16, and a storage device 17.

Still further, included are a first synchronizing signal generator (SSG1) 18 for low resolution which is operable at a video rate, a second synchronizing signal generator (SSG2) 19 for high resolution, a switch (SW) 20 for switching between the synchronizing signals, a timing generator (TG) 21 for generating a timing pulse for the operation of the image pickup sensor 3, and an image pickup control section 22 for controlling the image pickup system on the basis of image pickup control constants, which control section 22 contains an image pickup control constant calculating section 22a to perform calculation of the image pickup control constants related to the image pickup. Numeral 23 is indicative of a system control section for controlling the whole system, and 24 is representative of an operating section placed for the input operation by the users.

Secondly, a description will be made in terms of an operation thereof. As the image pickup sensor 3 is employed a solid type image pickup element such as a charge-coupled device (CCD), the number of pixels of which, for example, is as large as 250000, 410000 or more to enhance its resolution, and as the types there are, for example, a single-plate color sensor having a complementary-color (Cy, Mg, Ye, Gr) mosaic or RGB-stripe color filter stuck onto a chip, and a three-plate color sensor comprising three image pickup elements each having thereon a RGB single color filter stuck onto a chip. Here, the description will be made in the case of using a complementary-color mosaic signal-plate color sensor with 1536×988 pixels. The image pickup sensor 3 operates in two modes with the switch 20 practicing the change-over between the synchronizing signals with different frequencies from the first and second synchronizing signal generators 18 and 19.

First of all, a description will be made in terms of the first image pickup mode. In this first image pickup mode the first synchronizing signal generator 18 serves as a synchronizing signal generator for low resolution, that is, acts as an image pickup mode type synchronizing signal generator satisfactorily operating at its processing speed without using a memory. Here, as the synchronizing signal is used a synchronizing signal of a video signal (such as NTSC, PAL) in the ordinary television system. The timing generator 21 drives the image pickup sensor 3 in response to the synchronizing signal from the first synchronizing signal generator 18 so as to make the same access as a video CCD or the like to read out the 768×494 pixels matching with a video signal, in accordance with a way of decreasing the apparent number of pixels by combining the adjacent filter pixels, a way of thinning out the pixels by jumping over and reading out the pixels to be read out by the image pickup sensor 3, or a way of partially reading out only a specific area.

The image signal picked up by the image pickup sensor 3 enters the SH/AGC section 4 for the sample-and hold and automatic gain control (AGC), thereby allowing the switching noises to be removed therefrom to derive a signal component, which in turn is converted into digital data in the 10 bit A/D converting section 5. The converted image signal is delivered through the switch 6 into the first color processing section 7 to be color-converted into luminance two-color-difference YUV (RGB or the like) data which in turn is stored in the first memory 8 under the control of the first memory controller 9.

The YUV (or RGB) data once stored in the first memory 8 comes into the D/A converting section 10 to be transformed into an analog signal, and then goes into the encoder 11 to be modulated and outputted as a video signal to be subsequently displayed on a video monitor, not shown. Although the YUV (or RGB) data color-converted in the first color processing section 7 is once stored in the first memory 8 before being read out and supplied to the D/A converting section 10, it is also possible that the YUV (or RGB) data color-converted therein is delivered directly to the D/A converting section 10 and at the same time to the first memory 8.

Secondly, a description will be made in terms of the second image pickup mode. The second synchronizing signal generator 19 used in the second image pickup mode functions as a synchronizing signal generator for high resolution. The synchronizing signal generator for the "high resolution" means an image pickup mode synchronizing signal generator in which the process cannot be practiced without a memory. As the synchronizing signal is employed a synchronizing signal in the case of image-picking up a still picture with a high resolution. In accordance with the synchronizing signal developed in the second synchronizing signal generator 19, the timing generator 21 generates a drive pulse for the image pickup sensor 3.

As well as in the first image pickup mode, the image signal picked up by the image pickup sensor 3 is supplied to the SH/AGC section 4 where the sample-and-hold and automatic gain control (AGC) processes are effected in order to remove the switching noises from the image signal to derive a signal component therefrom, before being delivered to the 10-bit A/D converting section 5 to be converted into digital data. The image signal, translated into the digital data through the A/D converting section 5, passes through the switch 6 and then goes into the second color processing section 12 to be color-converted into YUV (or RGB) data and then stored in the second memory 13 under the control of the second memory controller 14.

The YUV (or RGB) data stored in the second memory 13, if required, is compressed in the compression/decompression section 15 before being sent out to an external file of the storage device 17 or a computer, not shown. Here, instead the image signal converted into the digital data through the A/D converting section 5 can also be directly supplied through the interface 16 to the external file or the unshown computer.

Figure 7:
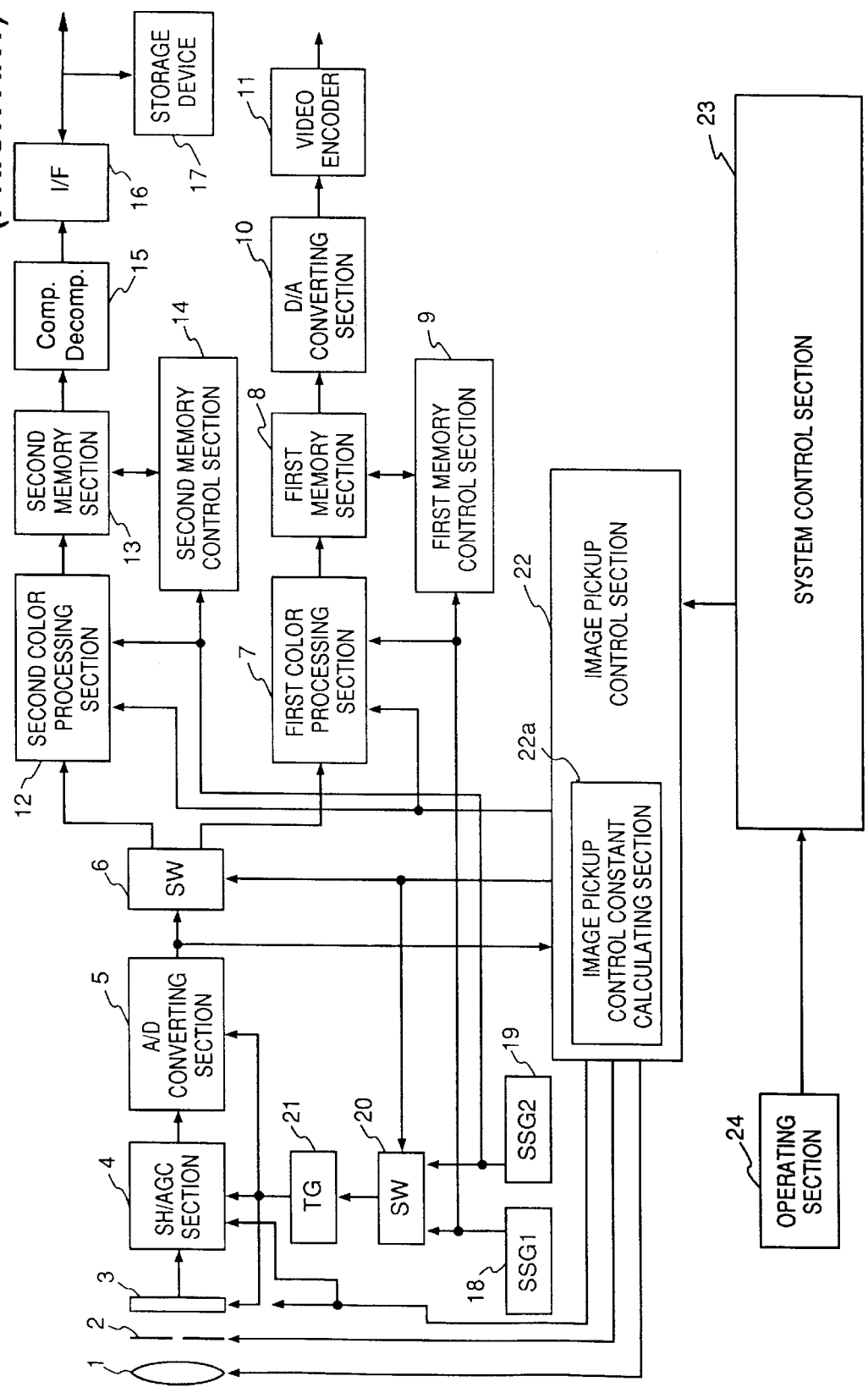
FIG. 7 is a block diagram illustrating an arrangement of a conventional image pickup device.

In FIG. 1, to the FIG. 7 arrangement there are further added an image pickup control constant supply section 22b, an image pickup control constant switching section 22c, and an image pickup control constant holding/correcting section 25. In addition, although directly related to this invention, in FIG. 1 there are illustrated an external control equipment 27 and an interface (i/f) 28. An image pickup means is made up of the optical lens 1, aperture 2, image pickup sensor 3 and SH/AGC section 4.

In accordance with an image pickup mode switching instruction from the system control section 23, the image pickup control constant holding/correcting section 25 holds the image pickup control constant calculated in the image pickup control constant calculating section 22a which was in operation in the first image pickup mode or corrects the held image pickup control constant to set it as the image pickup control constant for the second image pickup mode and then output the set image pickup control constant to the image pickup control constant supply section 22b of the image pickup control section 22.

The image pickup control constant supply section 22b holds the image pickup control constant from the image pickup control constant holding/correcting section 25. In accordance with the image pickup mode switching instruction from the system control section 23, the image pickup control constant switching section 22c performs the change-over between the image pickup control constant calculating section 22a and the image pickup control constant supply section 22b for obtaining the image pickup control constant to be used for the image pickup control section 22.

Furthermore, a description will be made hereinbelow in terms of its operation. The description will be made in terms of the image pickup control system which is different from the FIG. 7 arrangement. The image signal, outputted from the A/D converting section 5, is inputted into the image pickup control section 22. In the image pickup control section 22, the image pickup control constant calculating section 22a initially calculates image pickup control constants, for example, an automatic focus control evaluation value such as a peak value of a luminance signal within a given frame region of the image signal and a difference value between the maximum and minimum luminance values on a line, an automatic aperture control evaluation value such as an integral value of a luminance signal within a given frame region, and an automatic white-balance control evaluation value such as an integral value of a luminance signal within a given frame region and an integral value of a color-difference signal therein.

Using the calculated control constants, control for the image pickup system is made in terms of, for example, a focusing lens (included in the optical lens 1) for making an optimal focus, an aperture 2, shutter speed (an optical charging time of an image pickup sensor 3) and a gain (a gain of an SH/AGC section 4) for offering an optimal exposure, and a color correction (a correction for first and second color processing sections 7, 12) for regulating the white balance.

In addition, in accordance with the input from the operating section 24 or external control equipment 27 through the interface 28 and in response to the instruction from the system control section 23, there are carried out the image pickup mode switching control, i.e., the operations of a change-over switch 6 in the signal processing system, the operation of the synchronizing signal generator change-over switch 20, the manual setting of various image pickup control constants, and so on.

Moreover, the operation of the image pickup control section 22 will be described with reference to an operational algorithm in FIG. 2. The image pickup control constant calculating section 22a first calculates the image pickup control constant for the first image pickup mode (S101). The first image pickup mode control constant is outputted to both the image pickup control constant switching section 22c and image pickup control constant holding/correcting section 25 (S102). The second image pickup mode control constant from the image pickup control constant holding/correcting section 25 is held in the image pickup control constant supply section 22b (S103).

Then, a decision is made as to whether the image pickup mode is the first or the second (S104). When being in the first image pickup mode, the image pickup mode change-over switches 6, 20 are set to the first image pickup mode side (S105), and the image pickup control constant switching section 22c is set to the image pickup control constant calculating section 22a side (S106). On the other hand, when being in the second image pickup mode, the image pickup mode change-over switches 6, 20 are set to the second image pickup mode side (S107), and the image pickup control constant switching section 22c is set to the image pickup control constant supply section 22b side (S108). Finally, the control output for the image pickup system is made on the basis of the aforesaid image pickup control constant (S109).

In accordance with an image pickup mode switching instruction from the system control section 23, the image pickup control constant holding/correcting section 25 is made to hold the image pickup control constant in the image pickup control constant calculating section 22a used in the first image pickup mode, or to correct the held image pickup control constant to output it as the second image pickup mode control constant to the image pickup control constant supply section 22b of the image pickup control section 22.

Furthermore, the operation of the image pickup control constant holding/correcting section 25 will be described with reference to an operational algorithm in FIG. 3. The operation first waits for an instruction representative of the switching from the first image pickup mode to the second image pickup mode (S201). If the switching instruction comes, the first image pickup mode control constant from the image pickup control constant calculating section 22a is held (S202), or this first image pickup mode control constant held is corrected in accordance with an instruction from the system control section 23 (S203), and then outputted as the second image pickup mode control constant to the image pickup control constant supply section 22b of the image pickup control section 22 (S204). On the other hand, if the switching instruction from the first image pickup mode to the second image pickup mode does not appear in S201, the operational flow advances to S204 without any updating of the control constant to be outputted to the image pickup control constant supply section 22b.

Figure 2:
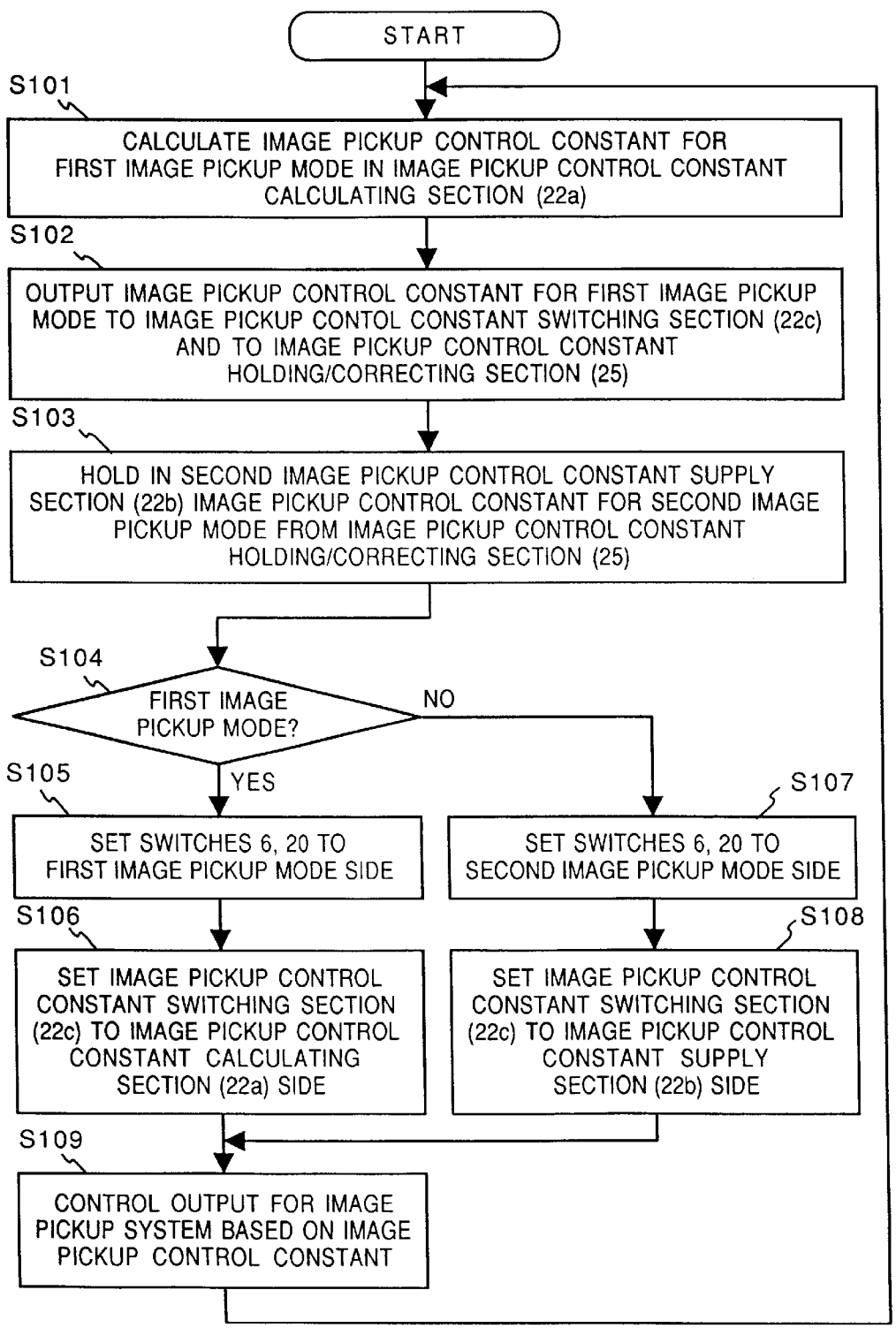
FIG. 2 is a flow chart showing an operational algorithm for an image pickup control section of the first embodiment according to this invention.
Figure 3:
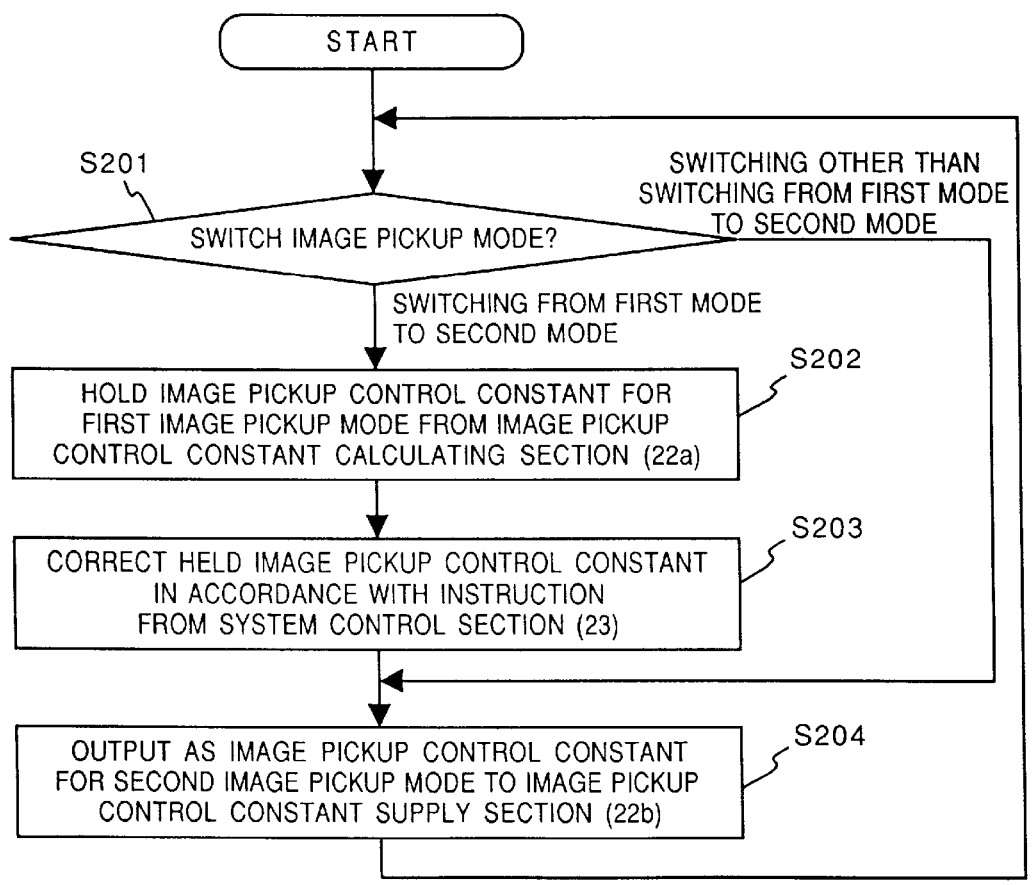
FIG. 3 is a flow chart illustrating an operational algorithm for an image pickup control constant holding and correcting section used for the first embodiment.

Although the detailed synchronizing arrangement between the image pickup control section 22 and image pickup control constant holding/correcting section 25 and so on are not illustrated in the FIGS. 2 and 3, it is possible to realize the synchronization therebetween with procedures for the control constant output being mutually and additionally provided therein or with the output being made steadily or periodically.

A more detailed description will be made in terms of the correction of the first image pickup control constant (the foregoing S203). First, a description will be made in the case that the exposure times (shutter speeds) differs from each other between the first and second image pickup modes. For example, let it be assumed that in the first image pickup mode the exposure (storage) time for one horizontal line is taken as 16.3 msec, and in the second image pickup mode it is taken to be 33.3 msec.

A still picture is initially picked up in the first image pickup mode. In this state, the switching to the second image pickup mode is made in order for inputting as a high-resolution still picture. The control constants on the focus, aperture, white balance and so on taken in the first image pickup mode are held. Although the control constants related to the focus and white balance can also be used as hey are, since the exposure times (shutter speeds) for the image pickup lens 3 in the first and second image pickup modes are different from each other, the control constant connected to the aperture is not usable as it is. Namely, if used as it is, the brightness (luminance) will be approximately doubled as compared with the original value. Thus, at the time of the switching to the second image pickup mode, the aperture control constant is corrected so that the aperture 2 reduces the exposure to half.

In addition to the correction of the aperture control constant, correction is effective to be made such that the gain control constant for the SH/AGC section 4 is reduced to half or such that the value of the A/D converting section 5 is reduced to half. A more appropriate correction is able to be done with combinations of the respective corrections. Although in this embodiment the exposure time vary depending upon the image pickup mode and is fixed, even in a case where the exposure times are the same, it is possible to deal with that case by correcting the above-mentioned image pickup control constants. In a system allowing change of the exposure times, it is naturally possible to utilize the correction of the control constants for the exposure time.

As the external control equipment 27 is considered a personal computer or the like, and the external control equipment 27 is the type which is also able to be subjected to a remote control operation through a device other than the operating section 24. The instruction is inputted through an interface (i/f) 28 into the system control section 23. In this case, the image pickup device is not essentially required to have the operating section 24.

As described above, in this first embodiment the image pickup control constant for the second image pickup mode is made to be obtainable on the basis of the image pickup control constant for the first image pickup mode when the switching operation is effected from the first image pickup mode (for example, video rate) to the second image pickup mode (for example, high-resolution still picture rate). Accordingly, there is no need for the image pickup control constant to be newly re-calculated after the switching to the second image pickup mode, thereby making it possible to immediately take an image in the second image pickup mode.

[Second Embodiment]

Figure 4:
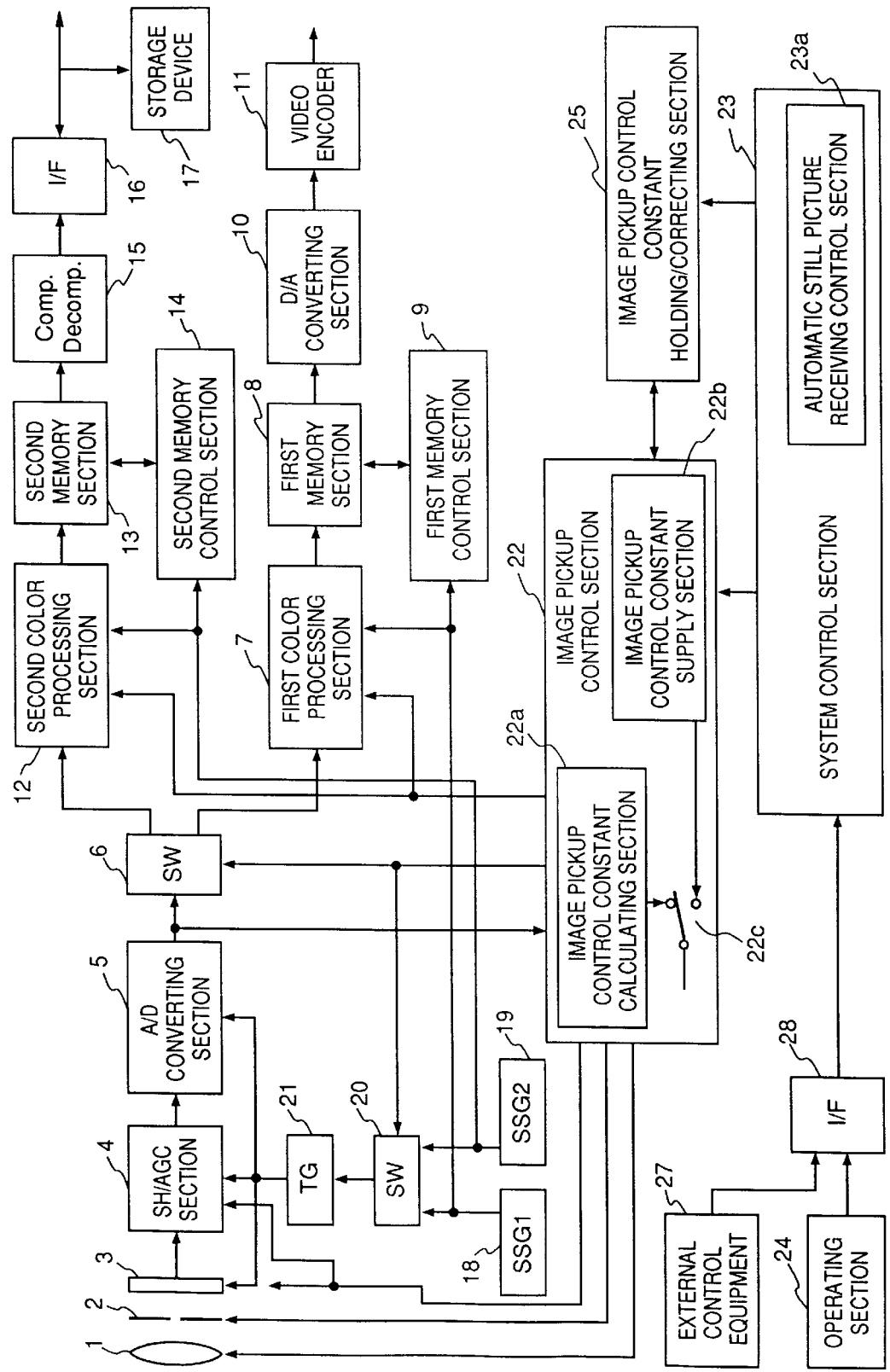
FIG. 4 is a block diagram showing an arrangement of an image pickup device according to a second embodiment of this invention.

FIG. 4 is a block diagram showing an arrangement of an image pickup device, which can take a plurality of image pickup modes, according to a second embodiment of this invention, the second embodiment being based on the above-described first embodiment. In FIG. 4, parts corresponding to those of the first embodiment are marked with the same reference numerals. The differences of the FIG. 4 arrangement from the FIG. 1 arrangement is that an automatic still picture receiving control section 23a is incorporated into the system control section 23 of the FIG. 1 arrangement.

The automatic still picture receiving control section 23a, in response to reception of an automatic still picture receiving instruction from an operating section 24, automatically performs a series of image pickup system control on taking a still picture, i.e., entering into the second image pickup mode, starting the still picture reception (pickup), detecting the completion of the still picture reception, and returning to the original image pickup mode (the first image pickup mode) after the completion of the still picture reception.

Secondly, a description will be made in terms of the operation thereof. Here, the description will be made only in terms of the image pickup system different from that illustrated in FIG. 7. An image signal outputted from an A/D converting section 5 is inputted into a image pickup control section 22. In this image pickup control section 22, there are calculated image pickup control constants, for example, an automatic focus control evaluation value such as a peak value of a luminance signal within a given frame region of the image signal and the difference value between the maximum and minimum luminance value of a line, an automatic aperture control evaluation value such as an integral value of a luminance signal within a given frame region, and an automatic white balance control evaluation value such as an integral value of a luminance signal within a given frame region and an integral value of a color-difference signal.

On the basis of the calculated control constants, control for the image pickup system is made in terms of, for example, a focusing lens (included in the optical lens 1) for focusing, an aperture 2, shutter speed (an optical charging time of an image pickup sensor 3) and a gain (a gain of an SH/AGC section 4) for offering an optimal exposure, and a color correction (a correction for first and second color processing sections 7, 12) for regulating the white balance.

In addition, in accordance with the input from the operating section 24 or external control equipment 27 and in response to the instruction from the system control section 23, there are carried out the image pickup mode switching control, i.e., the operations of a change-over switch 6 in the signal processing system, the operation of the synchronizing signal generator change-over switch 20, the manual setting of various image pickup control constants, and so on.

An image pickup control constant holding/correcting section 25, receiving an image pickup mode switching instruction from the system control section 23, holds the image pickup control constants of the image pickup control constant calculating section 22a used in the first image pickup mode or corrects the held image pickup control constants, and outputs them as the second image pickup control constants to an image pickup control constant supply section 22b of the image pickup control section 22.

Figure 5:
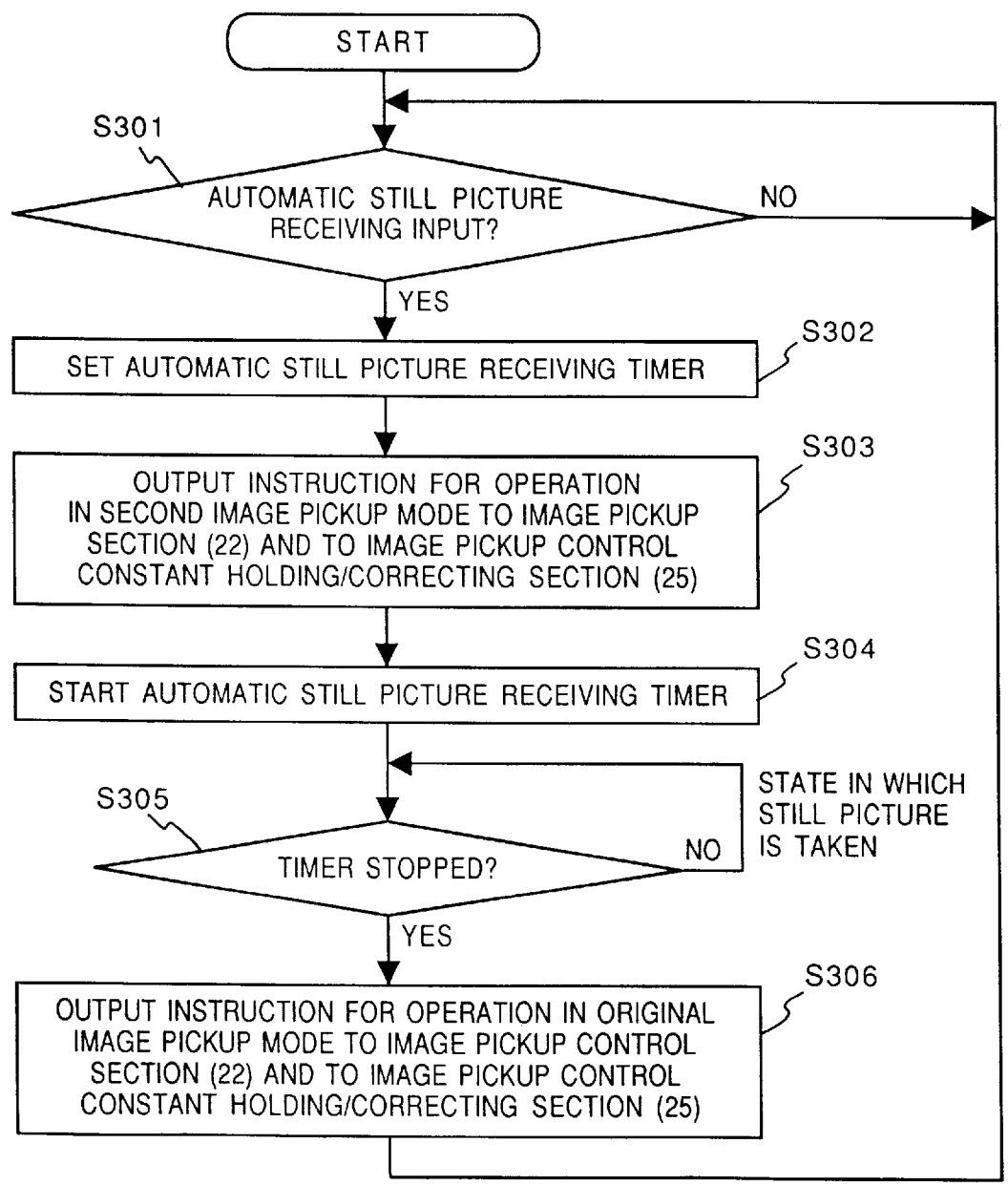
FIG. 5 is a flow chart showing an operational algorithm for an automatic still-picture input control section employed for the second embodiment.
Figure 6:
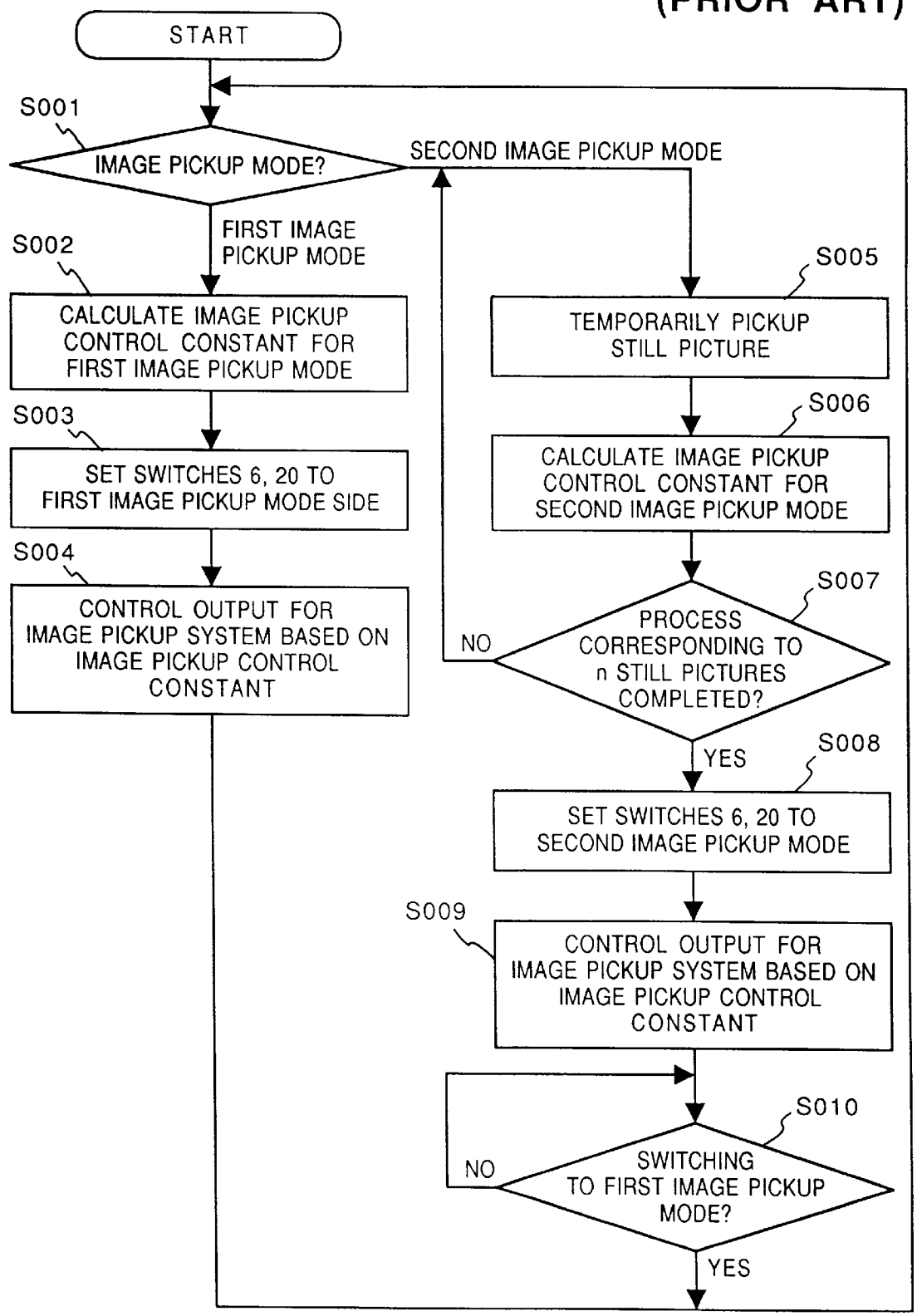
FIG. 6 is a flow chart showing an operational algorithm for a conventional image pickup control section.

On the other hand, the automatic still picture receiving control section 23a, in response to an automatic still picture receiving instruction from the operating section 24, automatically changes over the image pickup mode in relation to the still picture reception. Furthermore, the operation of the automatic still picture receiving control section 23a will be described with reference to an operational algorithm shown in FIG. 5. In accordance with an automatic still picture receiving instruction (S301) from the operating section 24, an automatic still picture receiving timer (a timer for determining a time operated in the second image pickup mode) is set (S302). An instruction is given to the image pickup control section 22 and further to the image pickup control constant holding/correcting section 25 for the operation in the second image pickup mode (S303). The automatic still picture receiving timer is started (S304), and in response to the timer stopping (S305), an instruction is given to the image pickup control section 22 and further to the image pickup control constant holding/correcting section 25 for the operation in the original image pickup mode (the first image pickup mode) (S306). As a result, the still picture is taken until the timer stops.

As the external control equipment 27 is considered a personal computer or the like, and the external control equipment 27 is the type which is also able to be subjected to a remote control operation through a device other than the operating section 24. The instruction is inputted through an interface 28 into the system control section 23.

As described above, with the time required for taking a still picture being set in advance, a series of image pickup mode switching control in the still picture receiving operation, such as starting the still picture reception, monitoring image pickup time, completing the image pickup, and returning to the original state after the completion, can automatically be accomplished by only the operation of a button. Accordingly, although, in the first embodiment, for taking a still picture the image pickup mode is required to be switched by the operation of the operating section 24 at the time of the start and completion of the pickup of the still picture, this second embodiment does not require operations other than one automatic still picture receiving operation, thus making the use easy. Although the second embodiment is described in terms of the automatic still picture reception, this invention includes all techniques to automatically perform a series of sequential control for switching between different image pickup modes.

Moreover, although in the above-described first and second embodiments two image pickup modes are realized by using two synchronizing signal generators 18, 19, it is also possible to employ an arrangement in which one synchronizing signal generator providing a synchronizing signal with a high frequency for the second image pickup mode is used so as to allow the first image pickup mode to be also treated by a memory process.

Furthermore, recently, an approach, which does not change the resolution (the number of pixels) of the image pickup sensor 3 but uses a pixel-shifting system and a memory to receive a high-resolution still picture, has been studied and developed, while it is obvious that an image pickup mode due to such an approach is also included in the image pickup modes in this invention.

It should be understood that the foregoing relates to only preferred embodiments of the invention, and that it is intended to cover all changes and modifications of the embodiment of the invention herein used for the purpose of the disclosure, which do not constitute departures from the spirit and scope of the invention.

What is claimed is:

1. An image pickup device equipped with image pickup means which photoelectrically converts an image, formed through a lens, into an image signal and outputs it, and operable in a plurality of image pickup modes, comprising:

an image pickup control section for calculating image pickup control parameters regarding an image pickup and for controlling said image pickup means on the basis of the calculated image pickup control parameters;

a system control section for controlling a switching between said plurality of image pickup modes; and an image pickup control parameter holding/correcting section for, in accordance with the switching control between said image pickup modes made by said system control section, holding said image pickup control parameters, wherein said system control section controls the switching to supply a drive signal having different frequencies to said image pickup means in accordance with image pickup modes, wherein said plurality of image pickup modes include a first mode for forming a first number of rows corresponding to a standard video signal, and a second mode for forming a second number of rows larger than said first number, and wherein said system control section corrects image pickup control parameters for said second mode based on at least an image pickup control parameter obtained using an output of said image pickup means in said first mode and the frequency change of said drive signal.

2. An image pickup device as defined in claim 1, wherein said plurality of image pickup modes include first and second image pickup modes, said first image pickup mode allowing a signal processing at a real time without requiring a memory, and said second image pickup mode requiring a memory for a signal process and not allowing a signal process to be effected at a real time.

3. An image pickup device equipped with image pickup means which photoelectrically converts an image, formed through a lens, into an image signal and outputs it, and operable in a plurality of image pickup modes, comprising:

an image pickup control section for calculating image pickup control parameters regarding an image pickup and for controlling said image pickup means on the basis of the calculated image pickup control parameters;

a system control section for controlling a switching between said plurality of image pickup modes;

an image pickup control parameter holding/correcting section for, in accordance with the switching control between said image pickup modes made by said system control section, holding said image pickup control parameters; and an automatic still picture receiving section for, in response to an automatic still picture receiving instruction from said system control section, automatically performing the switching control between said image pickup modes in accordance with a predetermined still picture receiving sequence, and for controlling said image pickup control parameter holding section in accordance with the performed switching control, wherein said system control section controls the switching to supply a drive signal having different frequencies to said image pickup means in accordance with said image pickup modes, wherein said plurality of image pickup modes include a first mode for forming a first number of rows corresponding to a standard video signal, and a second mode for forming a second number of rows larger than said first number, and wherein said system control section corrects image pickup control parameters for said second mode based on at least an image pickup control parameter obtained using an output of said image pickup means in said first mode and the frequency change of said drive signal.

4. An image pickup device as defined in claim 2, wherein said plurality of image pickup modes include first and second image pickup modes, said first image pickup mode allowing a signal processing at a real time without requiring a memory, and said second image pickup mode requiring a memory for a signal process and not allowing a signal process to be effected at a real time.

5. An image pickup device as defined in claim 4, wherein said first image pickup mode is employed for receiving an image at a resolution of a video signal, and said second image pickup mode is employed for receiving an image with a higher resolution than that of a video signal.

6. An image pickup method of using an image pickup device operable on the basis of different image pickup control parameters in a plurality of image pickup modes, comprising the steps of:

calculating and holding a first image pickup control parameter to be used in a first image pickup mode;

calculating and holding a second image pickup control parameter on the basis of said first image pickup control parameter; and selecting and using one of said first and second image pickup control parameters in accordance with an instruction representative of an image pickup mode, controlling switching between said plurality of image pickup modes to supply a drive signal having different frequencies in accordance with said image pickup modes, wherein said plurality of image pickup modes include a first mode for forming a first number of rows corresponding to a standard video signal, and a second mode for forming a second number of rows larger than said first number, and wherein said system control section corrects image pickup control parameters for said second mode based on at least an image pickup control parameter obtained using an output of image pickup means in said first mode and the frequency change of said drive signal.

7. An image pickup method according to claim 6, where the calculation of said second image pickup control parameter is made as a correction of at least a part of said first image pickup control parameter.

8. An image pickup method according to claim 7, wherein said first image pickup mode is employed for receiving an image at a resolution of a video signal, and said second image pickup mode is employed for taking an image with a higher resolution than that of a video signal.

9. An image pickup method according to claim 8, wherein said correction is made by one of an aperture, a gain, an analog-to-digital conversion by which an exposure is reduced to half, and/or a combination thereof.

10. An image pickup method according to claim 9, wherein said correction further includes a correction of an exposure time.

11. An image pickup method according to claim 6, further comprising the steps of:

giving an instruction indicative of a procedure of switching said plurality of image pickup modes in a predetermined sequence; and selecting and using said first and second image pickup control parameters in accordance with said predetermined sequence.

12. An image pickup method according to claim 11, wherein said procedure includes an automatic still picture receiving operation, and said predetermined sequence includes a switching operation from said first image pickup mode to said second image pickup mode and an switching operation from said second image pickup mode to said first image pickup mode.

13. An image pickup device operable on the basis of different image pickup control parameters in a plurality of image pickup modes, comprising:

first holding means for calculating and holding a first image pickup control parameter to be used in a first image pickup mode;

second holding means for calculating and holding a second image pickup control parameter to be used in a second image pickup mode;

image pickup mode control means for selecting and using one of said first and second image pickup control parameters in accordance with an instruction representative of an image pickup mode, and a system control section that controls a the switching between said plurality of image pickup modes to supply a drive signal having different frequencies to said image pickup mode control means in accordance with said image pickup modes, wherein said plurality of image pickup modes include a first mode for forming a first number of rows corresponding to a standard video signal, and a second mode for forming a second number of rows larger than said first number, and wherein said system control section corrects image pickup control parameters for said second mode based on at least an image pickup control parameter obtained using an output of image pickup mode control means in said first mode and the frequency change of said drive signal.

14. An image pickup device according to claim 13, wherein the calculation of said second image pickup control parameters is made as a correction of at least part of said first image pickup control parameter.

15. An image pickup device according to claim 14, wherein said first image pickup mode is employed for receiving an image at a resolution of a video signal, and said second image pickup mode is employed for taking an image with a higher resolution than that of a video signal.

16. An image pickup device according to claim 15, wherein said correction is made by one of an aperture, a gain, an analog-to-digital conversion by which an exposure is reduced to half, and a combination thereof.

17. An image pickup device according to claim 16, wherein said correction further includes a correction of an exposure time.

18. An image pickup device according to claim 17, further comprising:

means for giving an instruction indicative of a procedure of switching said plurality of image pickup modes in a predetermined sequence; and means for selecting and using said first and second image pickup control parameters in accordance with said predetermined sequence.

19. An image pickup device according to claim 18, wherein said procedure includes an automatic still picture receiving operation, and said predetermined sequence includes a switching operation from said first image pickup mode to said second image pickup mode and an switching operation from said second image pickup mode to said first image pickup mode.

20. An image pickup apparatus comprising;

an image pickup device for converting an optical image into an image signal;

a mode switch for switching between a first mode for forming a first image signal having a first number of rows corresponding to a standard TV system, and a second mode for forming a second image signal having a second number of rows, wherein said second number is larger than said first number;

calculating means for calculating at least one of an exposure parameter, a white balance parameter, a signal gain parameter, and a focusing parameter according to the first image signal;

control means for controlling an image pickup condition under said second mode depending on a parameter calculated using an output of said image pickup device in said first mode;

wherein said mode switch controls the switching between said modes to supply a drive signal having different frequencies to said image pickup device in accordance with said modes;

and wherein said mode switch corrects image pickup control parameters for said second mode based on at least an image pickup control parameter obtained using an output of said image pickup means in said first mode and the frequency change of said drive signal.

21. An apparatus according to claim 20, further comprising a memory for storing the parameter calculated in said first mode.

22. An apparatus according to claim 20, further comprising compression means for compressing said second image signal under said second mode.

* * * * *

UNITED STATES PATENT AND TRADEMARK OFFICE
CERTIFICATE OF CORRECTION

PATENT NO.    : 6,130,710
DATED         : October 10, 2000
INVENTOR(S)   : Hitoshi Yasuda It is certified that error appears in the above-identified patent and that said Letters Patent is hereby corrected as shown below:

Column 1,
Line 66, "n still pictures (S007). This n is" should read -- n still pictures (S007). This n is --

Column 7,
Line 56, "as hey are," should read -- as they are, --

Column 8,
Line 5, "exposure time vary" should read -- exposure times vary --

Column 11,
Line 64, "controlling switching" should read -- controlling a switching --

Signed and Sealed this

Sixth Day of August, 2002

*Attest:*

*Attesting Officer*

JAMES E. ROGAN
*Director of the United States Patent and Trademark Office*